US007644172B2

(12) United States Patent
Stewart et al.

(10) Patent No.: US 7,644,172 B2
(45) Date of Patent: Jan. 5, 2010

(54) COMMUNICATING VIA A CONNECTION BETWEEN A STREAMING SERVER AND A CLIENT WITHOUT BREAKING THE CONNECTION

(75) Inventors: James C. Stewart, Woodinville, WA (US); Tong L. Wynn, Redmond, WA (US); Sanjay Bhatt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 10/179,828

(22) Filed: Jun. 24, 2002

(65) Prior Publication Data

US 2003/0236907 A1  Dec. 25, 2003

(51) Int. Cl.
    *G06F 15/16* (2006.01)
(52) U.S. Cl. ........................ 709/231; 709/227
(58) Field of Classification Search ................ 709/231, 709/203, 227–228
    See application file for complete search history.

(56) References Cited

U.S. PATENT DOCUMENTS

| 5,892,915 | A  | * | 4/1999  | Duso et al. .................. 709/219 |
| 5,999,979 | A  |   | 12/1999 | Vellanki et al. |
| 6,014,706 | A  | * | 1/2000  | Cannon et al. .............. 709/231 |
| 6,052,710 | A  |   | 4/2000  | Saliba et al. |
| 6,128,653 | A  |   | 10/2000 | del Val et al. |
| 6,338,096 | B1 |   | 1/2002  | Ukelson |
| 6,516,338 | B1 | * | 2/2003  | Landsman et al. .......... 709/203 |
| 6,587,127 | B1 | * | 7/2003  | Leeke et al. ................ 715/765 |
| 6,662,231 | B1 | * | 12/2003 | Drosset et al. ............. 709/229 |
| 6,792,449 | B2 |   | 9/2004  | Colville et al. |
| 7,043,560 | B2 |   | 5/2006  | Coulombe et al. |
| 2002/0101442 | A1 | * | 8/2002  | Costanzo et al. ............. 345/723 |
| 2002/0128065 | A1 | * | 9/2002  | Chung et al. .................. 463/42 |
| 2003/0054794 | A1 | * | 3/2003  | Zhang ........................ 455/403 |
| 2003/0225889 | A1 |   | 12/2003 | Moutafov |
| 2005/0111467 | A1 |   | 5/2005  | Ng et al. |
| 2006/0242275 | A1 |   | 10/2006 | Shapiro |

OTHER PUBLICATIONS

Schulzrine et al., Real Time Streaming Protocol, Apr. 1998, The Internet Society, RFC 2326, pp. 5, 6, 8, 12, 16, 27, 33, 35, 36, 40, 75, and 76.*

Feilding et al., Hypertext Transfer Protocol 1.1, Jun. 1999, The Internet Society, RFC 2616, p. 136.*

Liang, et al.; "A Bandwidth Effective Streaming of JPEG2000 Images using HyperText Transfer Protocol"; Proceedings 2002 IEEE International Conference on Multimedia and Expo; Cat. No. 02TH8604; vol. 1; pp. 525-528; Aug. 2002.

Willebeek-Lemair, et al; "Bamba-Audio and video streaming over the Internet"; IBM Journal of Research and Development; Mar. 1998; vol. 42, No. 2; pp. 269-280.

(Continued)

*Primary Examiner*—Andrew Caldwell
*Assistant Examiner*—Bradford F Fritz
(74) *Attorney, Agent, or Firm*—Merchant & Gould PC

(57) ABSTRACT

Data can be streamed from a server to a client via an established connection. Commands (e.g., commands to navigate the streamed data) can be communicated to the server and streaming can continue (possibly from a different location) without breaking the connection. In one implementation, the connection is an HTTP 1.1 (HyperText Transfer Protocol version 1.1) connection.

29 Claims, 6 Drawing Sheets

OTHER PUBLICATIONS

Kobayashi, et al.; "Asymmertric TCP Splicing for Content-Based Switches"; 2002 IEEE International Conference on Communications; Conference Proceedings, ICC 2002; Cat. No. 02CH37333; vol. 2; pp. 1321-1326; Apr.-May 2002.

Deshpande, et al; "HTTP Streaming of JPEG2000 Images"; Proceedings International Conference on Information Technology; Coding and Computing; Apr. 2001; pp. 15-19.

Meeks, et al.; "Transducers and Associates: Circumventing Limitations of the World Wide Web"; Proceedings, The First Annual Conference on Emerging Technologies and Applications in Communications; May 1996; pp. 106-109; Cat. No. 96TB100035.

Real Time Streaming Protocol (RTSP); Network Working Group Request for Comments: 2326; Apr. 1998; pp. 1-92.

"Hypertext Transfer Protocol—HTTP/1.1"; Network Working Group Request for Comments: 2616; Jun. 1999; pp. 1-176.

Heidemann, J., "Performance Interactions between P-HTTP and TCP Implementions", SIGCOMM 1997.

Mogul, "The Case for Persistention HTTP", SIGCOMM 1995 ACM 0-89791-711-1/95/0008, pp. 299-314.

* cited by examiner

COMMUNICATING VIA A CONNECTION BETWEEN A STREAMING SERVER AND A CLIENT WITHOUT BREAKING THE CONNECTION

TECHNICAL FIELD

This invention relates to streaming media and data transfers, and particularly to communicating via a connection between a streaming server and a client without breaking the connection.

BACKGROUND

Content streaming, such as the streaming of audio, video, and/or text is becoming increasingly popular. The term "streaming" is typically used to indicate that the data representing the media is provided over a network to a client computer on an as-needed basis rather than being pre-delivered in its entirety before playback. Thus, the client computer renders streaming data as it is received from a network server, rather than waiting for an entire "file" to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

However, one problem encountered in streaming media is that the ability to communicate data and control information between the client and server during the streaming is desirable. This problem becomes more apparent in the presence of load balancing devices situated between the client and server. For example, multiple servers may be configured to stream the same media and a load balancing device relied upon to balance the number of clients each server is handling to be approximately equal (or in accordance with some other configuration) across the multiple servers. In these situations, it is important to ensure commands or requests issued by the client to the server are routed to the same server (the server that is streaming the data to the client) rather than some other server by the load balancer.

The communicating via a connection between a streaming server and a client without breaking the connection described below solves these and other problems.

SUMMARY

Communicating via a connection between a streaming server and a client without breaking the connection is described herein.

According to one aspect, data is streamed from a server to a client via an established connection. Commands (e.g., commands to navigate the streamed data) can be communicated to the server and streaming can continue (possibly from a different location) without breaking the connection. In one implementation, the connection is an HTTP 1.1 (HyperText Transfer Protocol version 1.1) connection.

BRIEF DESCRIPTION OF THE DRAWINGS

The same numbers are used throughout the document to reference like components and/or features.

FIG. 5 illustrates an exemplary message format.

DETAILED DESCRIPTION

Figure 1:
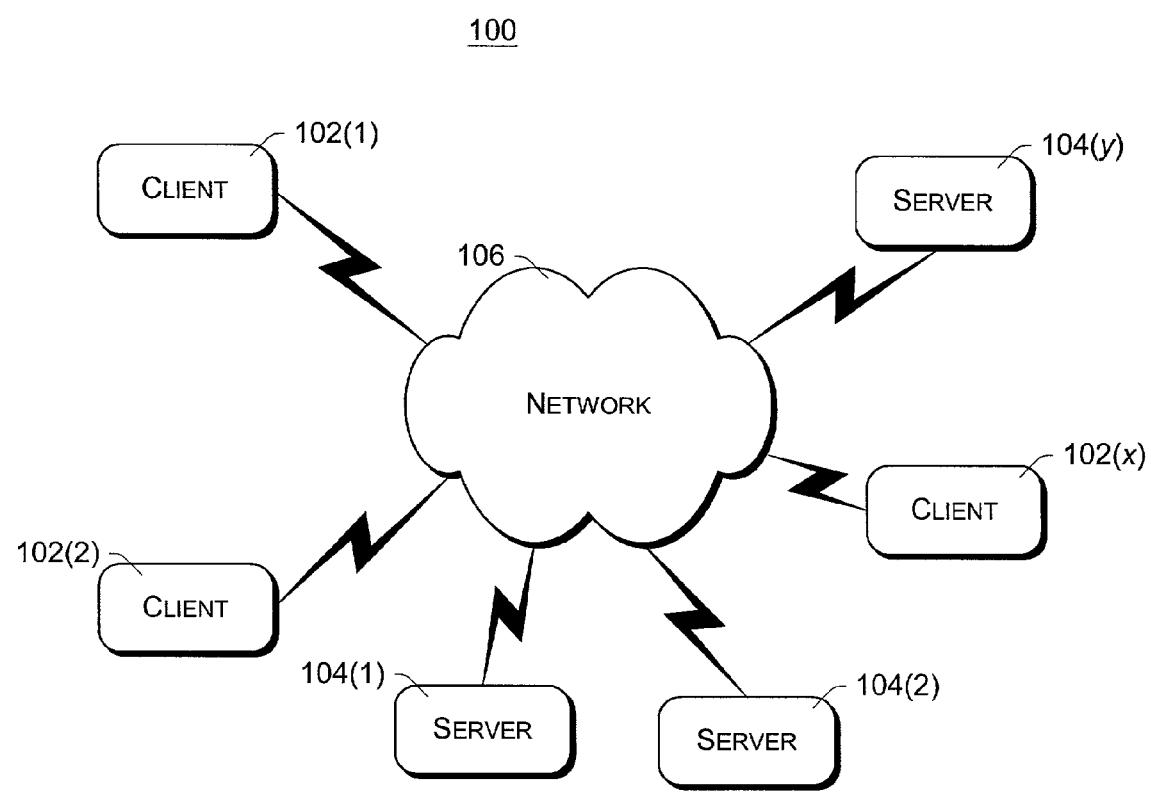
FIG. 1 illustrates an exemplary network environment.

FIG. 1 illustrates an exemplary network environment 100. In environment 100, multiple (x) client computing devices 102(1), 102(2), . . . , 102(x) are coupled to multiple (y) server computing devices 104(1), 104(2), . . . , 104(y) via a network 106. Network 106 is intended to represent any of a variety of conventional network topologies and types (including wired and/or wireless networks), employing any of a variety of conventional network protocols (including public and/or proprietary protocols). Network 106 may include, for example, the Internet as well as possibly at least portions of one or more local area networks (LANs).

Computing devices 102 and 104 can each be any of a variety of conventional computing devices, including desktop PCs, workstations, mainframe computers, Internet appliances, gaming consoles, handheld PCs, cellular telephones, personal digital assistants (PDAs), etc. One or more of devices 102 and 104 can be the same types of devices, or alternatively different types of devices.

Server devices 104 can make any of a variety of data available for streaming to clients 102. The term "streaming" is used to indicate that the data representing the media is provided over a network to a client device and that playback of the content can begin prior to the content being delivered in its entirety (e.g., providing the data on an as-needed basis rather than pre-delivering the data in its entirety before playback). The data may be publicly available or alternatively restricted (e.g., restricted to only certain users, available only if the appropriate fee is paid, etc.). The data may be any of a variety of one or more types of content, such as audio, video, text, animation, etc. Additionally, the data may be pre-recorded or alternatively "live" (e.g., a digital representation of a concert being captured as the concert is performed and made available for streaming shortly after capture).

Figure 2:
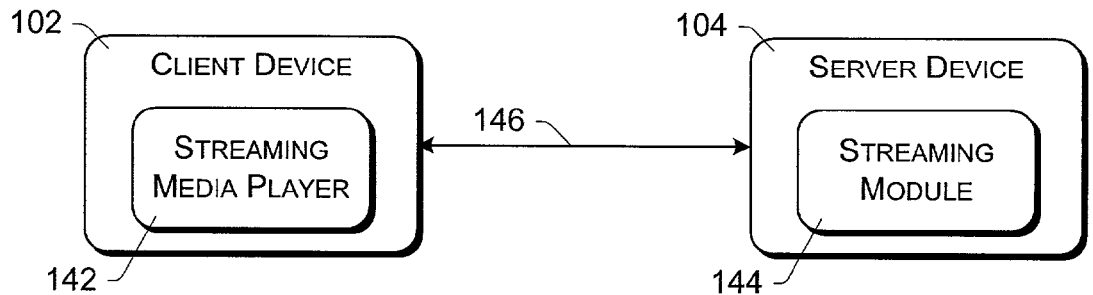
FIG. 2 illustrates exemplary client and server devices.

FIG. 2 illustrates exemplary client and server devices. Client device 102 includes a streaming media player 142 configured to access a streaming module 144 of server device 104. A HyperText Transport Protocol (HTTP) version 1.1 (HTTP 1.1) connection 146 is established between devices 102 and 104, allowing data and control information to be passed between streaming media player 142 and streaming module 144. Although not shown in FIG. 2, one or more additional devices (e.g., firewalls, routers, gateways, bridges, etc.) may be situated between client device 102 and server device 104. Once established, connection 146 (also referred to as a "socket") remains open, allowing commands to continue to be sent from client device 102 to server device 104 (rather than to some other server device). By leaving the connection 146 open, commands to navigate through the media being streamed can be communicated from client device 102 to server device 104, as discussed in more detail below.

Streaming media content can be stored and streamed to client device 102 in accordance with any of a variety of different streaming media formats. In one exemplary implementation, media is streamed in accordance with the ASF format (Advanced Streaming Format or Advanced Systems Format), including both current and proposed versions of the ASF specification. Additional information on ASF is available from Microsoft Corporation of Redmond, Wash.

Figure 3:
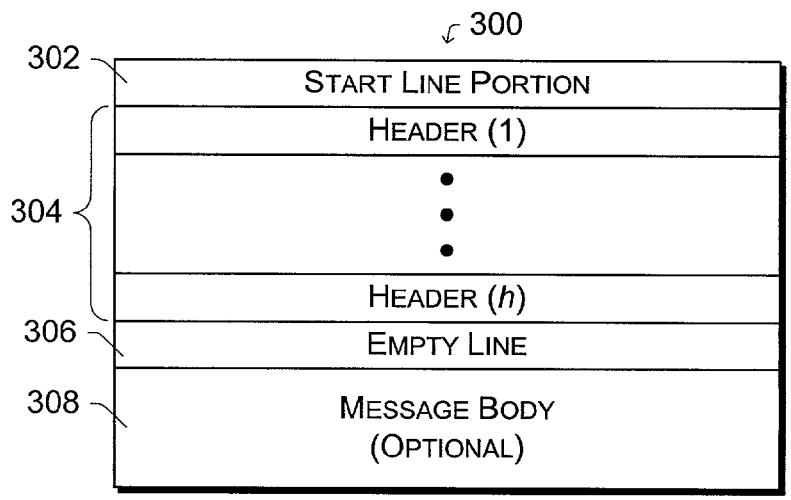
FIG. 3 is a flowchart illustrating an exemplary process for streaming media from a server device to a client device.
Figure 3:
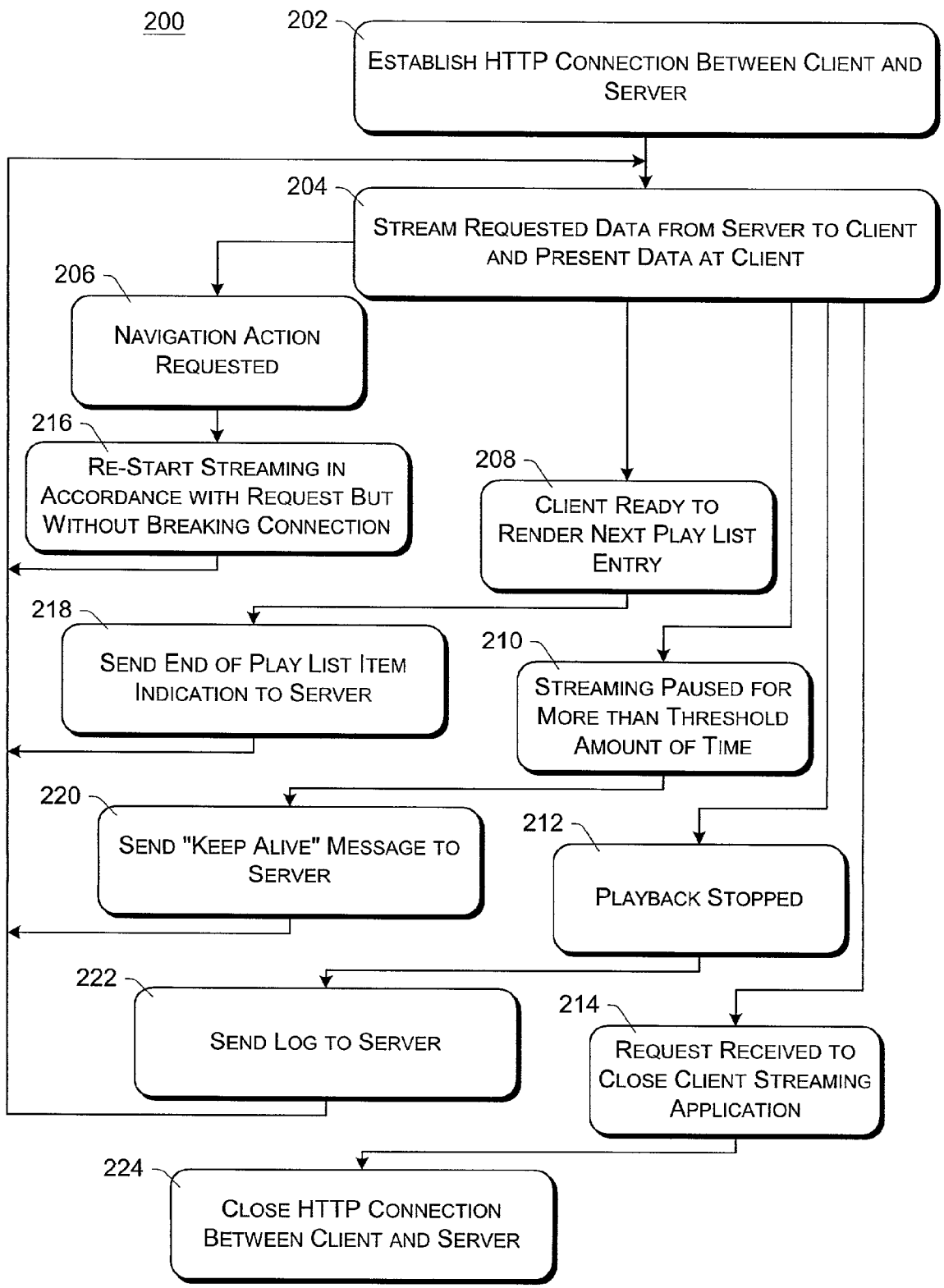

FIG. 3 is a flowchart illustrating an exemplary process 200 for streaming media from a server device to a client device. Process 200 is implemented by a combination of the server device and the client device, and may be performed in software. FIG. 3 is discussed with reference to components of FIG. 2.

Initially, an HTTP connection 146 is established between the client and server devices (act 202). In the discussions herein, this connection is an HTTP 1.1 connection, but alternatively it may be a connection using a different (e.g., a subsequent) version of HTTP. The connection can be established in a variety of different manners. Generally, server device 104 is initially configured to accept HTTP 1.1 requests (e.g., using port 80, although other ports could alternatively be used), typically via the Transmission Control Protocol/Internet Protocol (TCP/IP). Client device 102 generates a request to connect to a particular server by its identifier. This identifier is typically a uniform resource locator (URL) which identifies both the server device 104 as well as content on server device 104 to be accessed. In issuing a request to obtain content from a server device configured to receive such requests, and the subsequent response from the server to the client, an HTTP connection between the client and server is established.

Once the connection is established, the requested data is streamed from the server to the client (act 204). The streaming of data to the client continues (act 204) until one or more events occur: a navigation action is requested (act 206), the end of a play list item is reached at the client (act 208), streaming is paused for more than a threshold amount of time (act 210), playback is stopped (act 212), or a request to close streaming media player 142 is received (act 214).

If a navigation action is requested (act 206), then streaming of the data is re-started in accordance with the request but without breaking the connection 146 (act 216). Streaming media player 142 allows the user of client device 102 to input requests to navigate the streaming media. This navigation may include, for example, fast forwarding the media (at any of one or more fast forward speeds), rewinding the media (at any of one or more fast forward speeds), resuming playing of the media, scanning the media, seeking to a particular position in the media (e.g., as identified by playback time, or jumping to the next item in a play list, etc.), stopping playback of the media, and so forth. In response to such a user request, streaming media player 142 requests streaming module 144 to stop the current streaming and re-start streaming at a new position as identified by the user request. This stopping of the streaming and re-starting of the streaming is done without breaking the connection 146.

Depending on the particular navigation action, streaming media player 142 may immediately request streaming module 144 to stop the current streaming, or alternatively may delay the request. For example, if the navigation action is to rewind the media, then there may be no benefit in receiving additional data for the current stream, so the current streaming is stopped as soon as possible. By way of another example, if the navigation action is to stop playback of the media, then streaming media player 142 may wait to request streaming module 144 to stop the current streaming and instead have the data for the current stream buffered locally for a period of time.

If the end of a play list item is reached (or alternatively the end of any other piece being played is reached) and the player is ready to render the next entry (act 208), then a start next play list item indication is sent from streaming media player 142 to streaming module 144 (act 218). A play list is a list of one or more items (also referred to as entries), each item being a particular piece of content to be streamed. The manner in which a "piece" of content is defined can vary by implementation and based on the type of media. For example, for musical audio and/or video content each song can be a piece of content. Content may be separated into pieces along natural boundaries (e.g., different songs), or alternatively in other arbitrary manners (e.g., every five minutes of content is a piece). These different pieces of content can be selected (e.g., by the user or by some other party) to be grouped together in a play list, allowing a user to select all of them for rendering simply by selecting the play list.

A play list can be a client side play list or a server side play list. A client side play list can be built by the user, whereas a server side play list is created on the server (or alternatively some other device) and the user has no control over what is included in the server side play list. It should be noted that a client side play list can include, as an item in the play list, a server side play list. By way of example, a user may select twenty of his or her favorite songs to be part of a (client side) play list, and subsequently have those songs played back to him or her by selecting playback of the play list. By way of another example, a content provider may group a set of ten songs and three advertisements together into a (server side) play list and allow the user to playback all thirteen items by selecting playback of the play list.

In some situations, it is desirable for the streaming module 144 to be notified when streaming media player 142 is ready to render the next item in a play list. Such notifications assist, for example, in synchronizing player 142 and streaming module 144. Thus, each time streaming media player 142 has finished rendering the content corresponding to an item in a play list and is ready to receive the next entry, player 142 sends a notification to module 144 (act 218). This notification is sent to module 144 without breaking connection 146.

In alternate embodiments, media player 142 may not support play lists, in which case process 200 need not include acts 208 and 218.

If streaming of the data from module 144 to streaming media player 142 has been stopped or paused for greater than (or alternatively at least) a threshold amount of time (act 210), then a "keep alive" message is communicated to module 144 (act 220). Situations can arise where streaming of the data from module 144 to player 142 is paused for an extended period of time. For example, the user of device 102 may have selected to pause rendering of the media, and the data buffer (s) at device 102 may be full, so player 142 communicates a pause request to streaming module 144 in order to pause streaming of the media to player 142. However, in certain embodiments a time-out value is associated with the connection between devices 102 and 104. If an amount of time greater than the time-out value has passed without any communication along the connection (from player 142 or from module 144), then the devices at the ends of the connection assume that the connection is no longer needed and one or the other closes the connection. Thus, streaming media player 142 sends a "keep alive" message to module 144. This "keep alive" message constitutes a communication along the connection, and thus causes the devices to reset their respective counters for determining whether the time-out value is exceeded. So long as "keep alive" messages are sent prior to a counter meeting the time-out value, the connection will not be closed. The "keep alive" message sent (act 220) is also sent without breaking connection 146.

If playback of the streaming data has stopped (act 212), then a log of the playback is sent to server 104 (act 222). What constitutes stopping of the playback can vary by implementation. For example, terminating execution of streaming media player 142 at client device 102 (e.g., user-selection of an "exit" option) typically constitutes stopping playback. User-selection of a "stop" button (rather than a "pause" button) of a user interface of streaming media player 142, or selecting a different play list, may also constitute stopping playback.

Streaming media player 142 maintains a playback log of the rendering of streaming content at client device 102. This playback log may include, for example, how long particular pieces of content were played, which portions of streamed content were actually rendered, the identity of a user logged in to device 102 when streaming the content, etc. Any of a variety of statistical information regarding the device, the user of the device, as well as the actual content rendered may be logged.

The playback log is sent to the server (act 222) without breaking connection 146. No new connection need be established between client 102 and server 104 in order to send the log to server 104, so no intermediate device (e.g., a load balancer) has the opportunity to route the log to a different server. This ensures that the log is returned to the server actually streaming the data rather than some other server.

In alternate embodiments, media player 142 may not log rendering of streaming data at client device 102, in which case process 200 need not include acts 212 and 222.

If a request is received to close the streaming media player 142 (act 214), then connection 146 is closed (act 224). Optionally, a log may be sent to the server (act 212) prior to closing the connection. If streaming media player 142 is re-started, then a new connection to server 104 (or some other server) is established in order for data to be streamed to, and rendered by, media player 142.

Figure 4:
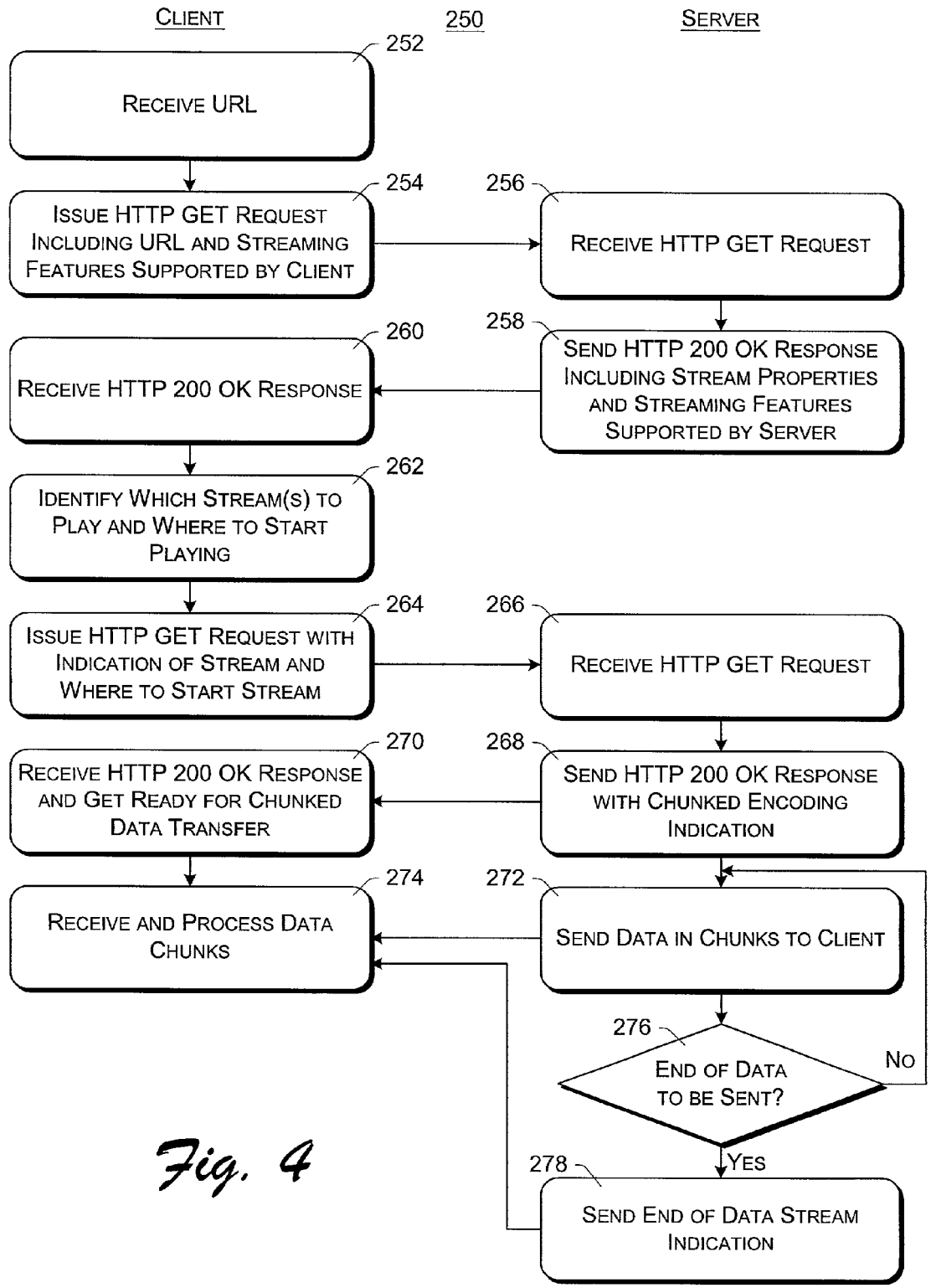
FIG. 4 is a flowchart illustrating an exemplary process for initiating and continuing streaming media from a server device to a client device.

FIG. 4 is a flowchart illustrating an exemplary process 250 for initiating and continuing streaming media from a server device to a client device. Process 250 is implemented by a combination of the server device and the client device, and may be performed in software. FIG. 4 is discussed with reference to components of FIG. 2. Acts performed by the client device are illustrated on the left side of FIG. 4, while acts performed by the server device are illustrated on the right side of FIG. 4.

Initially, a URL is received at streaming media player 142 of client 102 (act 252). The URL may be input by the user, input by another application executing on the client, input by user-selection of a hyperlink displayed at the client, etc. The URL identifies both a server(s) to be accessed and the content at that server(s) to be accessed. An HTTP 1.1 GET request including the URL and streaming features supported by streaming media player 142 is communicated to streaming module 144 of server 104 (act 254). The streaming features supported by streaming media player 142 can vary based on the implementation of streaming media player 142. In one implementation, where streaming media player 142 is a Windows Media™ player, examples of such streaming features include packet-pairs, stream switching, predictive stream selection, and so forth.

Streaming module 144 receives the HTTP 1.1 GET request (act 256) and returns an HTTP 1.1 200 OK response that includes stream properties and streaming features supported by streaming module 144 (act 258). The stream properties can vary by content, and the streaming features can vary by server. For example, stream properties may include the stream being seekable, the stream being stridable, the number of streams in the content (e.g., a file) to be streamed, the data rates of the stream(s) in the content, and so forth. Examples of streaming features include packet-pair, stream switching, predictive stream selection, and so forth. An additional streaming feature indicated by streaming module 144 is a timeout value that streaming module 144 uses to determine how long streaming module 144 will wait after receiving information from streaming media player 142 before closing the connection to streaming module 144. This timeout value can be subsequently overridden by streaming module 144 and returned to streaming module 144 in a subsequent GET request (e.g., in act 264 discussed below), thereby allowing streaming module 144 to define the timeout value.

The stream properties and streaming features communicated in acts 254 and 258 are incorporated in the request and response messages. FIG. 5 illustrates an exemplary HTTP 1.1 message format. The data structure 300 of an HTTP 1.1 message includes a start line field or portion 302, one or more header fields or portions 304, an empty line field or portion 306, and an optional message body field or portion 308. Start line portion 302 contains data identifying the message or data structure type, which can be either a request-line (e.g., for an HTTP 1.1 GET request) or a status-line (e.g., for an HTTP 1.1 200 OK response). One or more headers 304 are also included that contain data representing information about the message. An empty line portion 306 is used to identify the end of the headers 304. Additional data may optionally be included in message body portion 308.

The stream properties and streaming features communicated in acts 254 and 258 can be communicated as headers 304 in HTTP messages, as part of the body 308 of HTTP messages, or combinations thereof.

Returning to FIG. 4, streaming media player 142 receives the HTTP 1.1 200 OK response (act 260) and identifies which stream(s) to play and where to start playing the stream (act 262). For some content to be streamed, different versions of the content may be made available by streaming module 144, each version having different characteristics. For example, different versions may have different audio and/or video qualities, different versions may be in different languages (e.g., different audible languages or different sub-title languages), different versions may be time compressed (e.g., compressed to a 1.5× or 2× playback speed), etc. Streaming media player 142 may automatically select one of multiple streams or alternatively allow the user to select one of multiple streams (e.g., to select a particular language, to select a particular audio and/or video quality, etc.). Similarly, player 142 may automatically select a starting location (e.g., the beginning of the stream) or alternatively allow the user to select the starting location (e.g., have the user enter a temporal offset into the stream by number, having the user enter a location of the stream by moving an indicator along a bar representing the temporal length of the stream, etc.).

Streaming media player 142 then issues an HTTP 1.1 GET request that includes the indication of which stream and the location in that stream where streaming should begin (act 264). Streaming module 144 receives the HTTP 1.1 GET request (act 266) and sends an HTTP 1.1 200 OK response with a chunked encoding indication to streaming media player 142 (act 268). The chunked encoding indication is used by streaming module 144 to indicate to streaming media player 142 that the data transfer does not have a predefined length and that the data will be sent in pieces (chunks) with the end of the data being identified when streaming module 144 sends a zero-length chunk. In one implementation, chunked encoding is indicated by an HTTP 1.1 header "Transfer-encoding=chunked". The use of chunked encoding allows data to be transferred via HTTP 1.1 without identifying at the beginning of the transfer how much data will be transferred. Streaming media player 142 receives the HTTP 1.1 200 OK response and waits to start receiving the streaming data in chunks (act 270).

Server 104 then proceeds to send the data to streaming media player 142, beginning at the indicated location, in a series of messages (act 272). These messages are a series of one or more HTTP 1.1 200 OK response messages with the data included in the body of the messages. The chunks are received and processed by streaming media player 142 (act 274), resulting in the streaming data being rendered, beginning at the indicated location, by streaming media player 142. Streaming module 144 continues to send data in chunks until an end of data indication is to be sent (acts 276, 272). An end of data indication may need to be sent because a stop request has been entered at player 142, because the end of the data being streamed has been reached, etc. When an end of data indication is to be sent to streaming media player 142, streaming module 144 sends the end of data stream indication (act 278). In one implementation, this end of data stream indication is a zero-length chunk.

Additional information may also be communicated by streaming media player 142 to streaming module 144 in process 250. As part of receiving and processing the data chunks in act 274, when streaming media player 142 has finished rendering an entry in a play list and begun rendering a new play list item, player 142 sends an indication of such to streaming module 144. In one implementation, this indication is a play next entry header in a message to streaming module 144. The play next entry header is sent as an HTTP 1.1 GET request (alternatively, the play next entry header could be sent as a different request, such as an HTTP 1.1 POST request). For example, the play next entry header can be an HTTP 1.1 Pragma header (a Pragma header in HTTP 1.1 is a general-header field used to include implementation specific directives) that takes the following form:

Pragma: xPlayNextEntry=1

The play next entry header is a header 304 of FIG. 5. It is to be appreciated that the play next entry header may be implemented in different manners (e.g., using a directive other than "xPlayNextEntry=1", using a header other than a Pragma header, etc.). Alternatively, the play next entry indication may be embedded in the body of a message (optional body 308 of FIG. 5) rather than a header.

Additionally, streaming media player 142 monitors the amount of time has elapsed since the connection has become idle because the player has been stopped or paused. If this threshold amount of time has elapsed, then streaming media player 142 sends a "keep alive" message to streaming module 144. In one implementation, this "keep alive" message is an HTTP 1.1 OPTIONS request message including an "Options * HTTP 1.1" header (a header 304 of FIG. 5). This message serves as a message over connection 146, thereby keeping the server informed that the client is alive and intends to stream the same content again. Streaming module 144 will respond to the "keep alive" request message, however this response can be ignored by streaming media player 142 (because the connection will be kept open due to the request message sent by client 102). The threshold amount of time can vary, but should be less than the timeout value (as indicated in the properties from streaming module 144 in act 258 of FIG. 4 or subsequently overridden by streaming media player 142) so that the connection does not time out and is not closed by streaming module 144. Streaming media player 142 sends these keep alive messages to streaming module 144 in a timely manner so that server 104 does not disconnect client 102. Server 104 communicates the keep alive timeout value to client 102, which in turn can override the timeout value as discussed above. The timeout value can have different values, and in one implementation the timeout value is on the order of 60 seconds.

Figure 6:
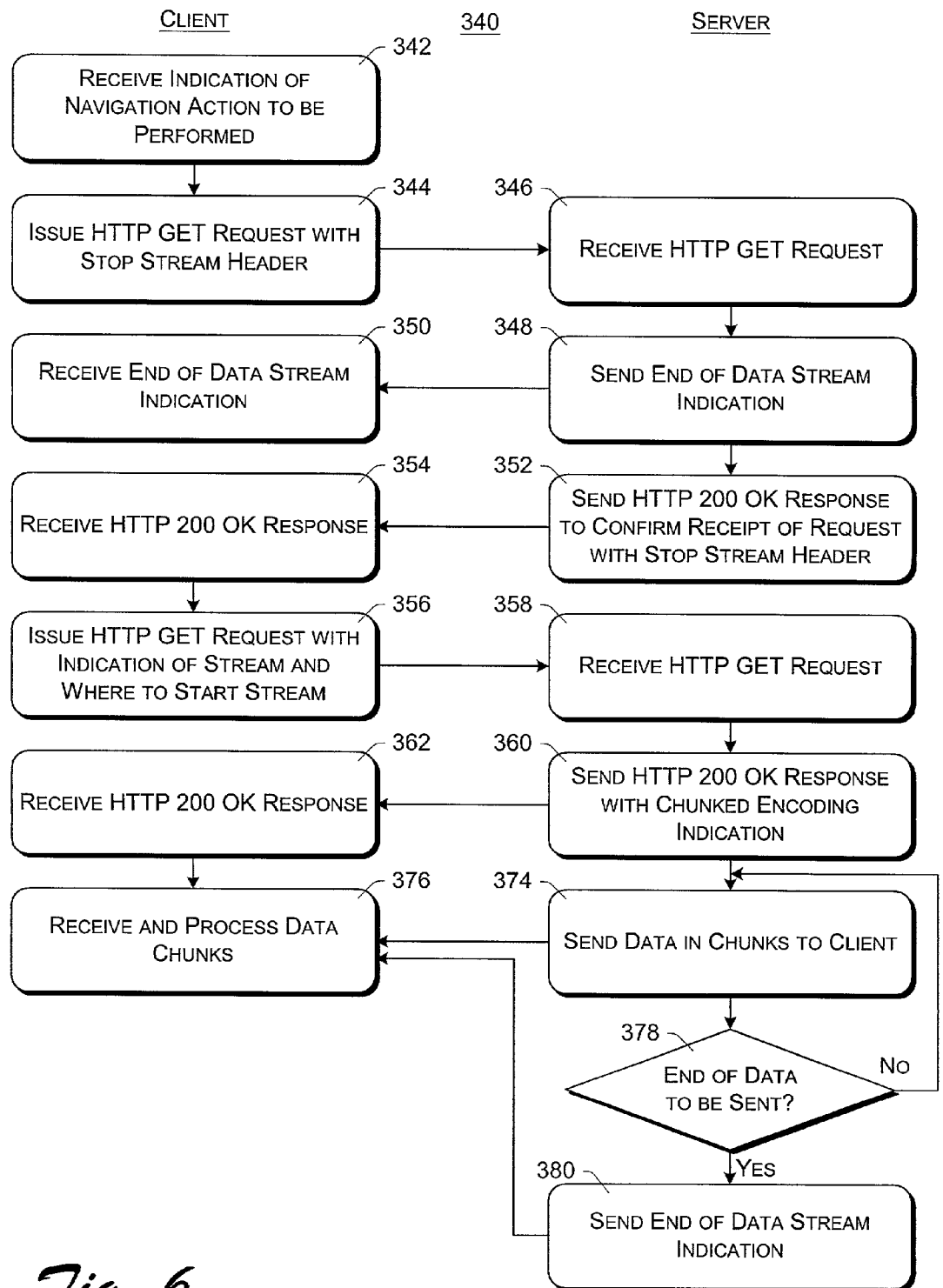
FIG. 6 is a flowchart illustrating an exemplary process for stopping and re-starting streaming media from a server device to a client device.

FIG. 6 is a flowchart illustrating an exemplary process 340 for stopping and re-starting streaming media from a server device to a client device. Process 250 is implemented by a combination of the server device and the client device, and may be performed in software. FIG. 6 is discussed with reference to components of FIG. 2. Acts performed by the client device are illustrated on the left side of FIG. 6, while acts performed by the server device are illustrated on the right side of FIG. 6.

Initially, an indication is received at streaming media player 142 of a navigation action to be performed (act 342). This may be, for example, a fast forward request, a rewind request, a seek request, a stop request, etc. Streaming media player 142 then issues an HTTP 1.1 GET request with a stop stream header (act 344). Alternatively, the stop stream header could be sent as a different request, such as an HTTP 1.1 POST request.

The stop stream header is one of headers 304 of FIG. 5, and is used by streaming media player 142 to indicate to streaming module 144 that it should stop the current streaming of data (the current sending of chunks of data) but should not close the connection between streaming media player 142 and streaming module 144. In one implementation, the stop stream header is an HTTP 1.1 Pragma header that takes the following form:

Pragma: xStopStrm=1

It is to be appreciated that the stop stream header may be implemented in different manners (e.g., using a directive other than "xStopStrm=1", using a header other than a Pragma header, etc.). Alternatively, the stop stream indication may be embedded in the body of a message (optional body 308 of FIG. 5) rather than a header.

Streaming module 144 receives the HTTP 1.1 GET request with the stop stream header (act 346) and sends an end of data stream indication to streaming media player 142 (act 348), analogous to act 278 of FIG. 4, which is received by player 142 (act 350). Streaming module 144 also sends an HTTP 1.1 200 OK response to streaming media player 142 in response to the HTTP 1.1 GET request in act 346 (act 352). Streaming media player 142 receives the HTTP 1.1 200 OK response (act 354) and issues an HTTP 1.1 GET request that includes the indication of which stream and a location in that stream where streaming should begin (act 356). The navigation action may be an action within the same stream (e.g., seeking forward to a new location in the stream) or an action within a different stream (e.g., a fast forward stream, a rewind stream, etc.). For example, a temporal offset in the new stream (corresponding to the seeked to location) may be identified in act 356, a new stream (e.g., a fast forward stream) and location in the new stream (e.g., corresponding to the current location in the previous stream) may be identified in act 356, etc. The navigation action may also change the manner in which the current stream is streamed to player 142. For example, if the navigation action is fast forward, then the timeline of the current stream may be compressed (so that playback is speeded up) rather than switching to a fast forward stream. Streaming module 144 receives the HTTP 1.1 GET request (act 358) and sends an HTTP 1.1 200 OK response with a chunked encoding indication to streaming media player 102 (act 360). Streaming media player 102 receives the HTTP 1.1 200 OK response and waits to start receiving the streaming data in chunks (act 362).

Streaming module 144 then proceeds to send the data to streaming media player 102, beginning at the identified location, in a series of data packets that is each a "chunk" (act 374). The chunks are received and processed by streaming media player 102 (act 376), resulting in the streaming data, beginning at the identified location, being rendered by streaming media player 142. Streaming module 144 continues to send data in chunks until an end of data indication is to be sent (acts 378, 374). An end of data indication may need to be sent for any of the same reasons as discussed above with reference to FIG. 4. When an end of data indication is to be sent to streaming media player 102, streaming module 144 sends the end of data stream indication (act 380). In one implementation, this end of data stream indication is a zero-length chunk.

Alternatively, rather than issuing two separate HTTP 1.1 GET requests in acts 344 and 356, the requests may be combined. For example, streaming media player 102 can send a single HTTP 1.1 GET request that includes a stop stream header and also includes the indication of which stream and a location in that stream where streaming should begin.

Additionally, the navigation actions supported by process 340 (e.g., received in act 342) may also be server side play list navigation actions. These navigation actions can be, for example, jumping or seeking to previous or next pieces of content in the server side play list. To support such play list navigation actions, additional headers are used to identify the current play list entry being played by the client as well as whether the user desires to jump to the next entry or the previous entry. Given this information (the current entry and which direction the user desires to jump), streaming module 144 can readily determine the next entry in the play list to be played.

A play list seek header is used to identify the current play list entry being played by the client. For example, the play list seek header can be an HTTP 1.1 Pragma header that takes the following form:

Pragma: playlist-seek-id=generationid where generationid represents an identifier, generated by server 104 (or alternatively the creator of the play list), of the current play list entry. This identifier may uniquely identify the entry to server 104, may globally uniquely identify the entry, or may uniquely identify the entry among a group of servers and/or other devices. The play list seek header is a header 304 of FIG. 5. It is to be appreciated that the play list seek header may be implemented in different manners (e.g., using a directive other than "playlist-seek-id=generationid", using a header other than a Pragma header, etc.). Alternatively, the play list seek indication may be embedded in the body of a message (optional body 308 of FIG. 5) rather than a header.

A play list offset header is used to indicate whether the user desires to jump to the next entry or the previous entry. For example, the play list offset header can be an HTTP 1.1 Pragma header that takes the following form:

Pragma: pl-offset=direction where direction represents a value indicating either forward (jumping to the next entry) or backward jumping to the previous entry). An additional "count" parameter may also be included in the play list offset header, indicating how many entries the user desires to jump. For example, rather than jumping to the next entry or the previous entry, the user may desire to jump three entries ahead of the current entry, or two entries behind the current entry. The play list offset header is a header 304 of FIG. 5. It is to be appreciated that the play list offset header may be implemented in different manners (e.g., using a directive other than "pl-offset=direction", using a header other than a Pragma header, etc.). Alternatively, the play list offset indication may be embedded in the body of a message (optional body 308 of FIG. 5) rather than a header.

Other actions besides navigation commands can also cause stopping and restarting streaming media from a server device to a client device analogous to process 340. One such action is bandwidth switching, in which streaming media player 102 desires to switch to a lower-quality or higher-quality stream. Streaming media player 102 issues an HTTP 1.1 GET request with a stop stream header (act 344), and then issues another HTTP 1.1 GET request with an indication of the new stream it desires (act 356). Analogous to the discussions above, the bandwidth switching can occur without breaking the connection between client 102 and server 104.

Many of the discussions above assume an HTTP 1.1 connection can be established between the client and server devices. However, in some situations, an intermediary proxy may not support HTTP 1.1 (e.g., it may only support HTTP 1.0), in which case the chunked data transfers described herein will not be performed (as HTTP 1.0 does not support chunked data transfers). An HTTP message being communicated via one or more proxies includes a Via header (one of headers 304 of FIG. 5) that identifies the names of each such proxy as well as the HTTP versions supported by each such proxy. Streaming media player 102, upon receipt of the HTTP 1.1 200 OK response in act 260 of FIG. 4, checks the Via header to determine whether any intermediary proxy does not support HTTP 1.1, and if at least one intermediary proxy does not support HTTP 1.1, then some other means for streaming the data is used (e.g., using HTTP 1.0) rather than using the processes discussed above.

Figure 7:
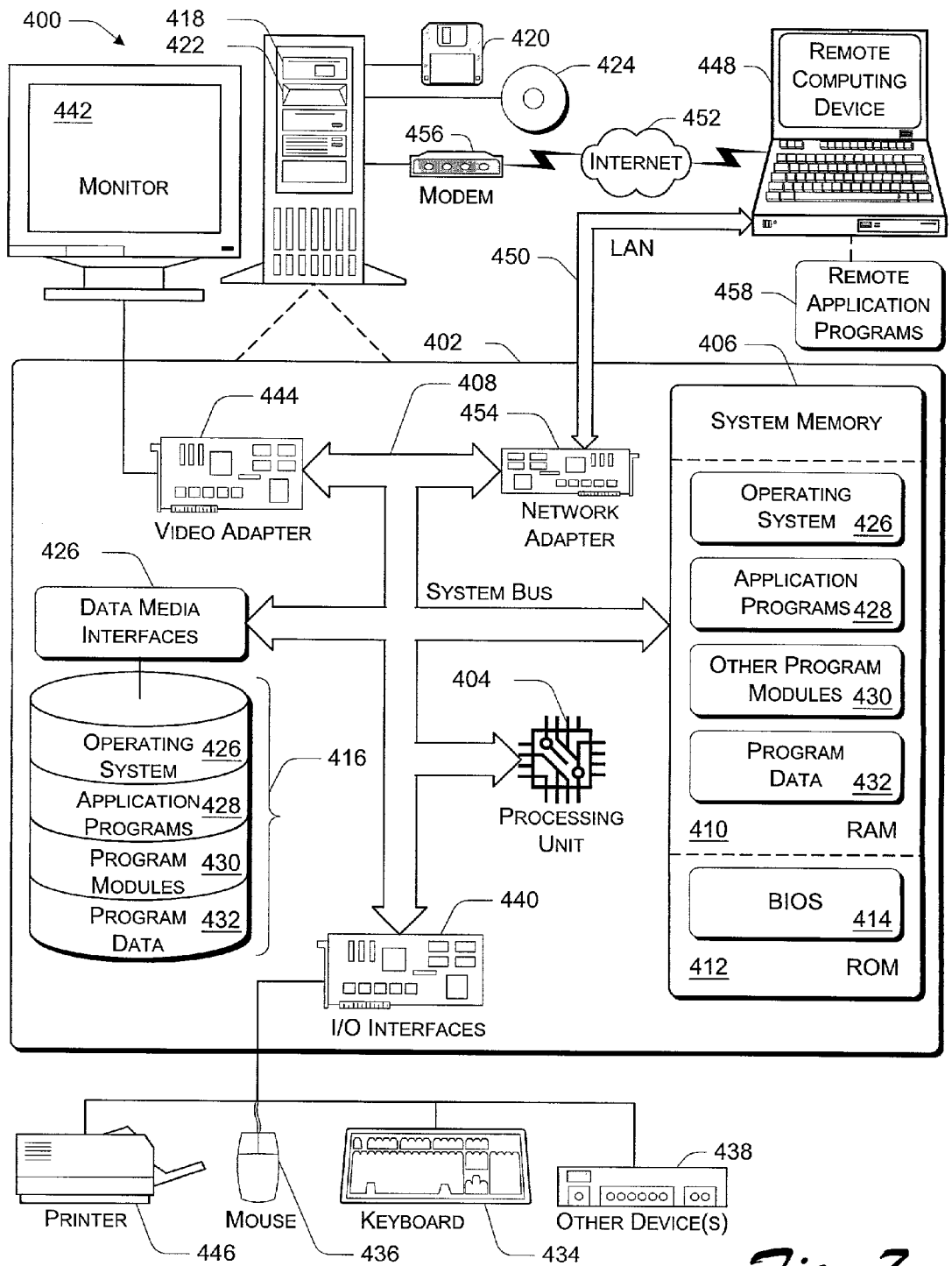
FIG. 7 illustrates a general computer environment, which can be used to implement the techniques described herein.

FIG. 7 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a client 102 or server 104 of FIGS. 1 and 2. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 14 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other is medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The techniques described herein thus allow data to be streamed from a server device to a client device using HTTP 1.1. This allows streaming media to be easily passed through firewalls, as HTTP communications are typically readily passed through firewalls. Additionally, the techniques described herein allow load balancing devices (such as routers) to operate and balance the streaming load among multiple server devices (the balancing being done at the time the connection is established), but not interfere with subsequent changes in the streaming due to navigation actions.

It should also be noted that the techniques described herein allow data to be streamed and navigated through using HTTP 1.1 without closing the connection between client and server. The connection may pass through one or more intermediary proxies, however, the messages passed between client and server are simply HTTP 1.1 request and response messages, so the proxies do not interfere with the messages. The proxies need not have, and typically do not have, any knowledge that media streaming is occurring with these messages.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having stored thereon a plurality of instructions that, when executed by one or more processors of a client, causes the one or more processors to:
   establish an open connection with a server, wherein the established connection provides for streaming media data from the server to the client in chunks in accordance with the HyperText Transfer Protocol (HTTP);
   receive an indication of a navigation action to be performed;
   send, via the established connection, a HTTP request with a first stop stream header;
   receive, via the established connection, an end of data stream indication;
   send, via the established connection, a HTTP request with an indication of a media data location where the server should resume streaming media data to the client;
   receive, via the established connection, streaming media data beginning with the media data location;
   navigate at least one of a plurality of media data play list navigation actions, the media data play list navigation actions being at least one from the group consisting of: jump to next play list entry and jump to previous play list entry, wherein each play list navigation action is identified using a Pragma header with a form comprising: Pragma: pl-offset=value;
   send, after beginning rendering of a next item in the media data play list, a HTTP request with an indication to the same server that rendering of the next item in the media data play list has begun, wherein the indication facilitates server side load balancing;
   send a HTTP request with a second stop stream header;
   send a HTTP request with an indication of a new stream to switch to without breaking the established connection;
   receive a response to the stream switching request;
   send, via the established connection, if streaming of the media data to the client has been paused for at least a threshold amount of time, a keep alive message without breaking the established connection; and
   send a playback log to the server that is streaming media data to the client without breaking the established connection between the server and the client;
   wherein the playback log comprises how long particular pieces of content were played, which portions of streamed content were rendered, an identity of a user logged in, and statistical information.

2. One or more computer readable storage media as recited in claim 1, wherein the navigation action comprises one or more of: fast forward, seek, scan, and rewind.

3. One or more computer readable storage media as recited in claim 1, wherein the stop stream header is part of a HyperText Transfer Protocol GET request.

4. One or more computer readable storage media as recited in claim 1, wherein the stop stream header comprises: Pragma:xStopStrm=1.

5. One or more computer readable storage media as recited in claim 1, wherein the end of data stream indication comprises a zero-length chunk.

6. One or more computer readable storage media as recited in claim 1, wherein the established connection passes through one or more proxies between the client and the server.

7. One or more computer readable storage media as recited in claim 1, wherein the established connection is in accordance with HTTP 1.1.

8. One or more computer readable storage media as recited in claim 1, wherein an amount of time passed without any communication along the connection is greater than a timeout value associated with the established connection causes the one or more processors to determine whether the established connection should be closed due to inactivity.

9. One or more computer readable storage media as recited in claim 1, wherein the keep alive message includes a HyperText Transport Protocol Options * header.

10. One or more computer readable storage media as recited in claim 1, wherein the indication comprises a HyperText Transfer Protocol message including a header, the header comprising: Pragma:xPlayNextEntry=1.

11. One or more computer readable storage media having stored thereon a plurality of instructions that, when executed by one or more processors of a server, causes the one or more processors to:
   establish an open connection with a client;
   receive, via the established connection, which provides for streaming media data of an indefinite length from the server to the client in accordance with the HyperText Transfer Protocol (HTTP), a first stop stream header;
   send, via the established connection, an end of data stream indication;
   receive, via the established connection, an HTTP request with an indication of a new location where the server should resume streaming media data to the client;
   resume streaming, via the established connection, media data beginning with the new location;
   navigate at least one of a plurality of media data play list navigation actions, the media data play list navigation actions being at least one from the group consisting of: jump to next play list entry and jump to previous play list entry, wherein each media data play list navigation action is identified using a Pragma header with a form comprising: Pragma: pl-offset=value;

receive, after beginning rendering of a next item in the media data play list, an indication that rendering of the next item in the media data play list has begun, wherein the indication facilitates server side load balancing;

receive a HTTP request with a second stop stream header;

receive a HTTP request with an indication of a new stream to switch to without breaking the established connection;

send a response to the stream switching request;

if streaming of the media data to the client has been paused for at least a threshold amount of time, then receive, via the established connection, a keep alive message without breaking the established connection; and receive a playback log at the server that is streaming media data to the client without breaking the established connection between the server and the client;

wherein the playback log comprises how long particular pieces of content were played, which portions of streamed content were rendered, an identity of a user logged in, and statistical information.

12. One or more computer readable storage media as recited in claim 11, wherein the new location comprises a location in a same stream for which the end of data stream indication was sent.

13. One or more computer readable storage media as recited in claim 11, wherein the new location comprises a location in a different stream than the stream for which the end of data stream indication was sent.

14. One or more computer readable storage media as recited in claim 11, wherein the stop stream header is part of a HyperText Transfer Protocol GET request.

15. One or more computer readable storage media as recited in claim 11, wherein an amount of time passed without any communication along the established connection is greater than a time-out value associated with the connection causes the one or more processors to determine whether the connection should be closed due to inactivity.

16. One or more computer readable storage media as recited in claim 11, wherein the end of data stream indication comprises a zero-length chunk.

17. One or more computer readable storage media as recited in claim 11, wherein the established connection is in accordance with HTTP 1.1.

18. A method comprising:

establishing an open connection with a server;

having the established connection for communicating messages in accordance with the HyperText Transfer Protocol (HTTP);

requesting media data be streamed from the server to the client via the established connection;

receiving the streaming media data via the established connection;

receiving a user request to stop the streaming of the media data;

receiving a user request to perform a navigation action, wherein the navigation action re-starts the streaming of the media data;

receiving the re-started streaming of the media data, via the established connection, in accordance with the user request;

wherein the stopping and the re-starting streaming media data from the server to the client occurs without breaking the established connection;

sending an indication to the same server that rendering of the media data by the client has begun, wherein the method facilitates server side load balancing; and receiving a HTTP request with a stop stream header;

receiving a HTTP request with an indication of a new stream to switch to without breaking the established connection;

sending a response to the stream switching request;

navigating at least one of a plurality of play list navigation actions, the play list navigation actions being at least one from the group consisting of: jump to next play list entry and jump to previous play list entry, wherein each play list navigation action is identified using a Pragma header with a form comprising: Pragma: pl-offset=value;

if the streaming of the media data to the client has been paused for at least a threshold amount of time, then send, via the established connection, a keep alive message without breaking the established connection; and sending a playback log to the server streaming media data to the client without breaking the established connection between the server and the client;

wherein the playback log comprises how long particular pieces of content were played, which portions of streamed content were rendered, an identity of a user logged in, and statistical information.

19. A method as recited in claim 18, further comprising:
checking whether any HTTP 1.0 proxies exist in the path between the server and the client; and
using HTTP 1.0 if any HTTP 1.0 proxies exist in the path, otherwise using HTTP 1.1.

20. A method as recited in claim 18, further comprising:
sending, after beginning rendering of a next item in the play list, an indication to the server that rendering of the next item in the play list has begun, wherein the method facilitates server side load balancing.

21. A method as recited in claim 18, further comprising:
sending, via the established connection, the playback log if playing of the streamed data has been stopped.

22. A method as recited in claim 18, wherein re-starting the streaming of the data comprises communicating a stop stream header as part of a HyperText Transfer Protocol GET request to the server.

23. A method as recited in claim 22, wherein the stop stream header comprises:
Pragma:xStopStrm=1.

24. A method as recited in claim 18, wherein the established connection is in accordance with HTTP 1.1.

25. A method as recited in claim 18, wherein the keep alive message includes a HyperText Transport Protocol Options * header.

26. A method comprising:
establishing an open connection with a client;
having the established connection for communicating messages in accordance with the HyperText Transfer Protocol (HTTP);
receiving, from the client via the established connection for communicating messages in accordance with the HyperText Transfer Protocol (HTTP), a request for media data be streamed from a server to the client;
streaming the requested media data to the client via the established connection;
receiving, from the client via the established connection, a request to stop the streaming of the media data;
stopping the streaming of the media data;

receiving, via the established connection, an indication that a user has requested a navigation action within the media data being streamed, wherein the navigation action is for re-starting the streaming of the media data;

re-starting the streaming of the media data, via the established connection, in accordance with the user request;

wherein the stopping and the re-starting streaming media data from the server to the client occurs without breaking the established connection;

receiving an indication to the same server that rendering of the media data by the client has begun, wherein the method facilitates server side load balancing;

receiving a HTTP request with a stop stream header;

receiving a HTTP request with an indication of a new stream to switch to without breaking the established connection;

sending a response to the stream switching request;

navigating at least one of a plurality of play list navigation actions, the play list navigation actions being at least one from the group consisting of: jump to next play list entry and jump to previous play list entry, wherein each play list navigation action is identified using a Pragma header with a form comprising: Pragma: pl-offset=value;

if streaming of the media data to the client has been paused for at least a threshold amount of time, then receive, via the established connection, a keep alive message; and receiving a playback log at the server streaming media data to the client without breaking the open connection between the server and the client;

wherein the playback log comprises how long particular pieces of content were played, which portions of streamed content were rendered, an identity of a user logged in, and statistical information.

27. A method as recited in claim 26, wherein the receiving an indication that a user has requested a navigation action comprises receiving a stop stream header as part of a HyperText Transfer Protocol GET request.

28. A method as recited in claim 26, further comprising:
determining whether the established connection should be closed due to inactivity if an amount of time passed without any communication along the established connection is greater than a time-out value associated with the established connection.

29. A method as recited in claim 26, wherein the connection is in accordance with HTTP 1.1.

* * * * *